Sept. 23, 1947.  M. T. HOSTER  2,427,967
ROTATABLE MEANS FOR DECANTING LIQUIDS FROM SOLIDS
Filed Jan. 1, 1944  4 Sheets-Sheet 1
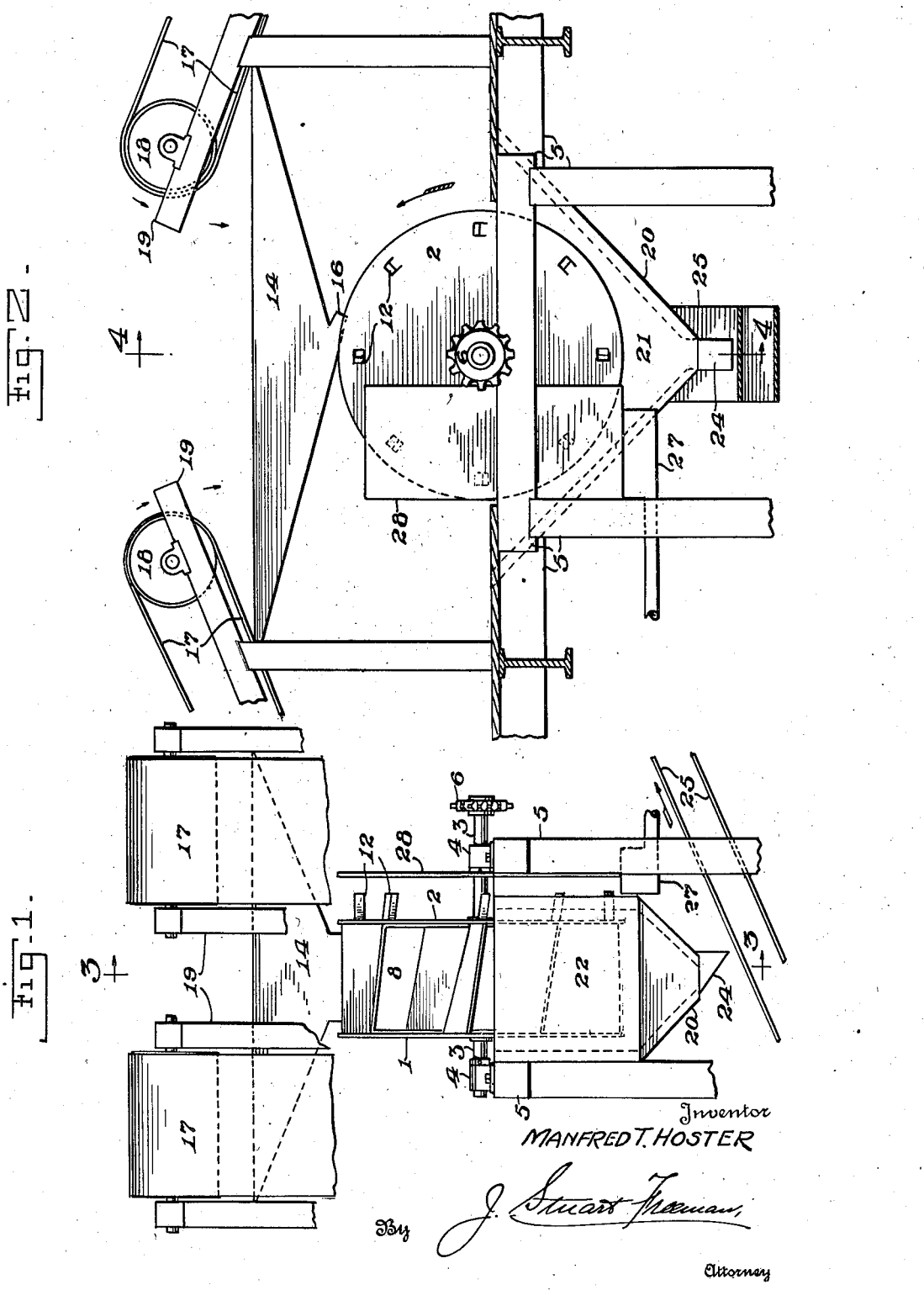
Inventor
MANFRED T. HOSTER
By J. Stuart Freeman
Attorney

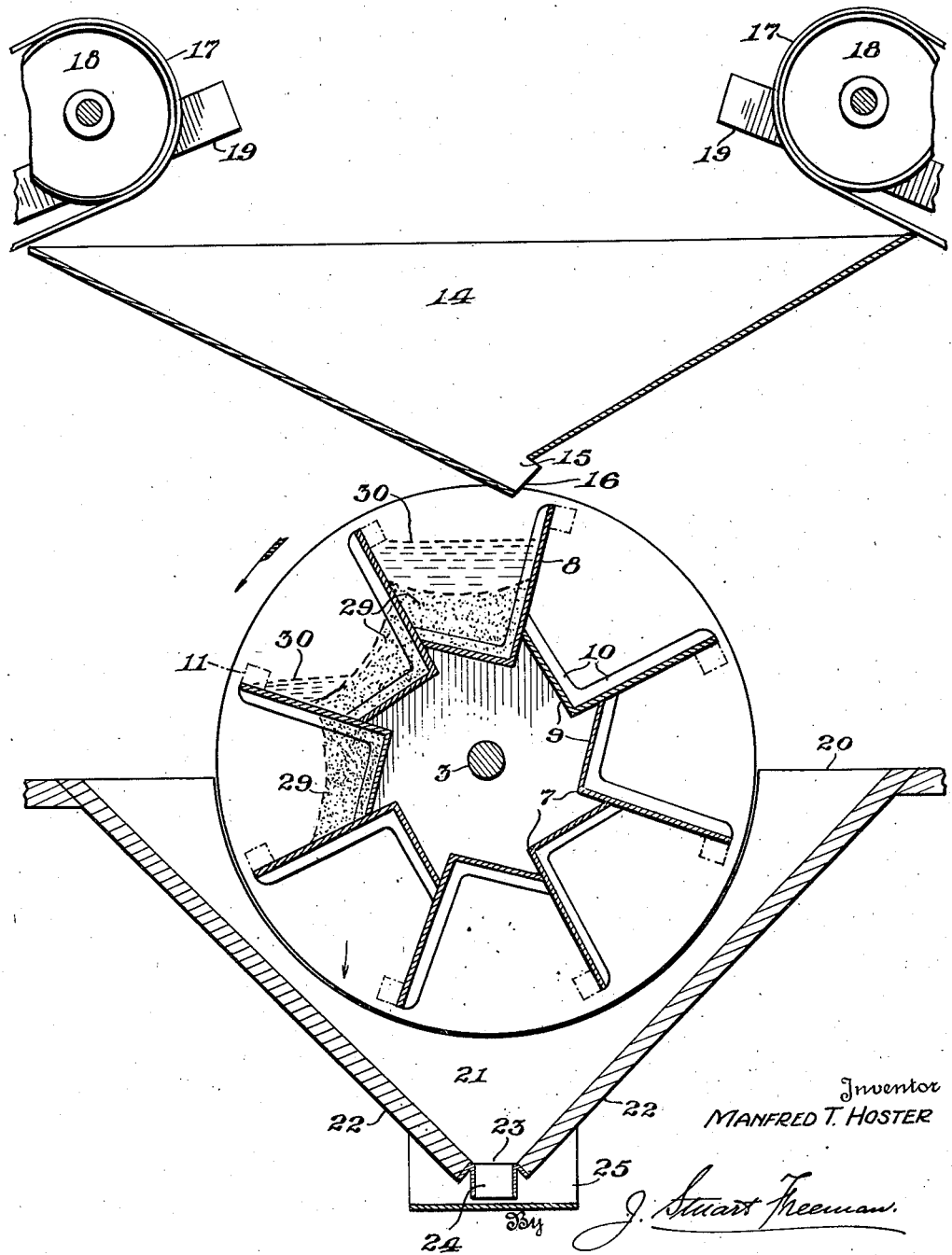

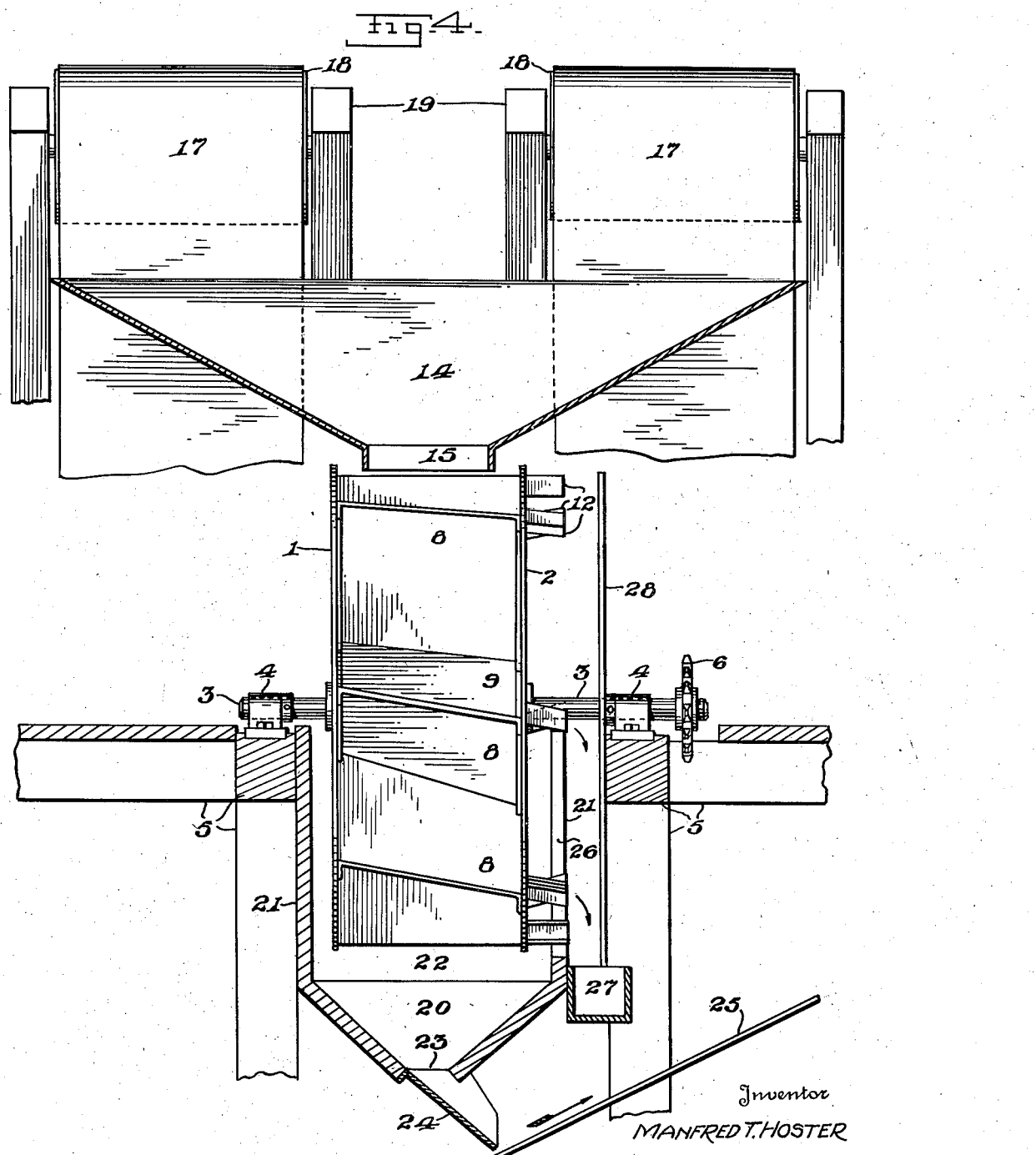

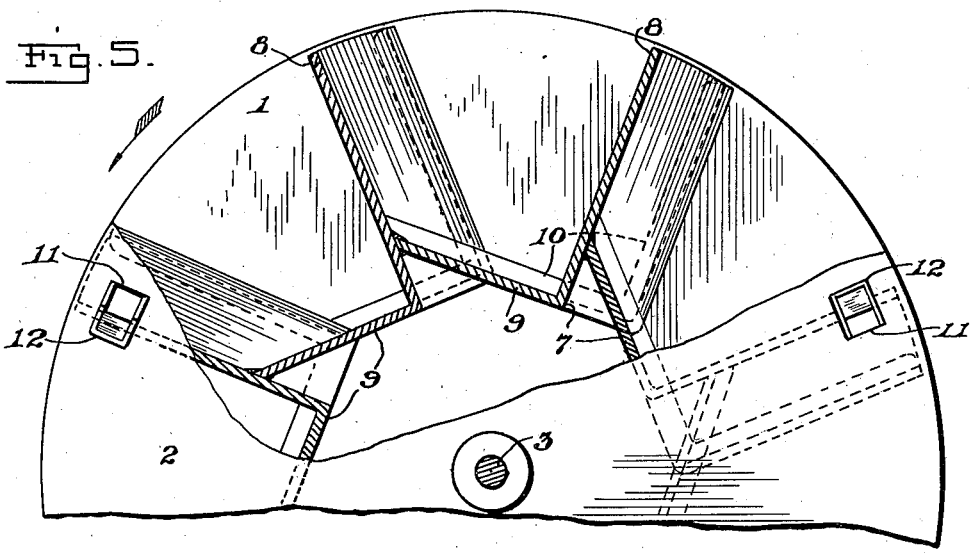
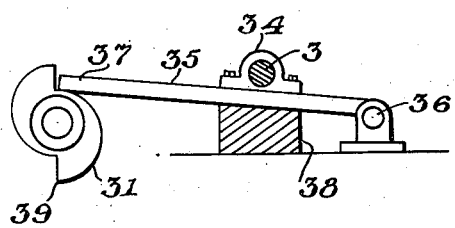
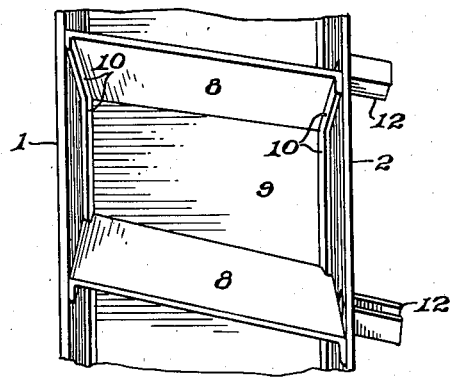
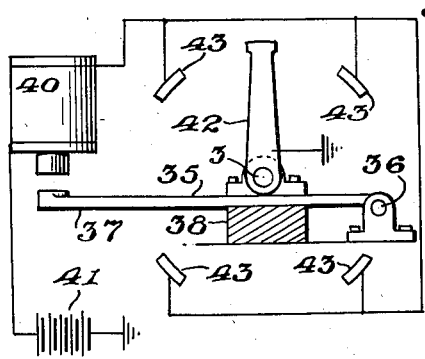
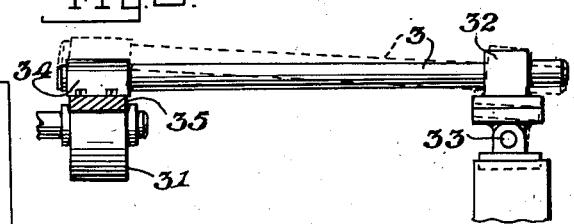
Inventor
MANFRED T. HOSTER

Patented Sept. 23, 1947

2,427,967

UNITED STATES PATENT OFFICE 2,427,967

ROTATABLE MEANS FOR DECANTING LIQUIDS FROM SOLIDS

Manfred T. Hoster, St. Peters, Pa.

Application January 1, 1944, Serial No. 516,674

4 Claims. (Cl. 210—51)

The object of the invention is to provide an improved device that will expedite and at the same time increase the efficiency in the separation of liquids from solids, especially in the de-watering of ores of various kinds, coal and the like. For purposes of illustration, but without intending to limit the uses of said invention in any way, specific reference will be made to the de-watering of iron ore.

The iron ore is first ground, resulting in the production of both coarsely and finely ground particles, the latter approximating that of 10 to 100 mesh. These are separated by water, the coarse particles being re-ground to a finer degree, and both the initially finely ground and the re-ground particles being fed with water through a magnetic separator, from which the gangue is discharged, while the iron concentrate with additional water is fed to the improved machine hereinafter described. This machine then operates to substantially separate the finely ground iron particles from the water and any minor impurities that may be carried thereby, following which the iron is ready for sintering preparatory to smelting.

Another object is to provide a de-watering wheel or the like, comprising a circumferentially arranged, slowly rotatable series of compartments, into which the liquid mass flows consecutively, the particles of iron almost immediately settling to the bottom of a given compartment in a relatively compact body, while the separated water flows freely through and from one side of the wheel, as said compartment gradually rotates as a part of said wheel from an upper to a lower position, subsequent to which said compartment in approaching complete inversion drops its mass of iron particles upon a moving conveyor belt, or otherwise as may be desired.

Still another and more specific object is to provide in such a machine an improved de-watering wheel, comprising circumferentially arranged compartments or pockets between and supported by a pair of parallel discs, each compartment being characterized by forward walls (in the direction of rotation), the inner surfaces of which walls are set obliquely with respect to the plane of rotation, so as to direct substantially all of the water and any flocculated non-metallic matter to one side, whence the separated water is discharged by way of overflow spouts laterally beyond the transverse limits of said wheel, leaving the mass of iron particles as a relatively solid sedimentary deposit in the bottom of each compartment, until it reaches a substantially inverted position, when and where it falls freely therefrom into a hopper, which guides it towards the belt or other suitable means for conveying it to storage bins, cars, trucks, or other transporting means, or instead it may be first dried before being thus disposed of.

And a still further object is to provide a modified form of de-watering wheel, comprising a shaft or bearing adapted to rise and fall intermittently, and means for jolting said wheel by alternately raising at least one end of said shaft and the wheel carried thereby, and dropping the same a sufficient distance to (1) more firmly compact and exclude the water from said particles at an upper position of a compartment, and to (2) jar the mass of said particles loose from said compartment as it approaches an inverted position.

With the objects thus briefly stated, the invention comprises further details of construction and operation, when read in conjunction with the accompanying drawings, in which Fig. 1 is a front elevation of a machine comprising one embodiment of the invention; Fig. 2 is a right side elevation of the same; Fig. 3 is a vertical section on the line 3—3 of Fig. 1; Fig. 4 is a vertical section on the line 4—4 of Fig. 2, showing the wheel in elevation; Fig. 5 is an enlarged fragmentary portion of the wheel shown in side elevation and with a portion of one side disc broken away; Fig. 6 is an enlarged fragmentary portion of the wheel shown in elevation and perspective, looking radially into one of said compartments; Fig. 7 is a diagrammatic fragmentary view showing a cam-operated means for imparting jolts to the revolving wheel, for the purpose of first excluding water from the ore and later jarring the precipitated ore from the several compartments thereof in succession; Fig. 8 is a front elevation of the same; and Fig. 9 is a diagrammatic view showing an electro-magnetically operated mechanism for similarly jarring said wheel and the ore therefrom.

Referring to the drawings, one embodiment of the invention comprises a rotatable element or wheel, which in turn is composed of a pair of spaced parallel discs 1 and 2, forming the concentric sides of said element. These discs are mounted in any suitable manner upon a shaft (or gudgeons) 3, which are rotatably supported in bearings 4, carried by any suitable form of framework 5, while upon one end of said shaft is mounted a sprocket wheel 6, by which motive power is supplied from any available source, preferably through an intermediate reduction gear (not shown) for the purpose of reducing the usual speed of such a driving mechanism as an electric motor, an internal combustion engine, or the like, sufficiently to cause said element to rotate at a speed of only approximately one revolution or less per minute.

Extending between the discs 1 and 2 are angularly shaped partitions 7, which may be made of sheet metal, or instead may be cast in a single piece, each partition comprising a preferably radially extending section 8 forming the rear wall of a compartment upon the forward side thereof, and a second section 9 at approximately 90° with respect to said first section, and forming the bottom wall of said compartment. The forward wall of said compartment is defined by the rear face of the radial section 8 of the partition next adjacent thereto, as shown in Figs. 3 and 5. These partitions may be secured in position in any suitable manner, but for purposes of illustration are shown as comprising flanges 10, which are riveted, spot-welded, or otherwise firmly secured, to the respective discs 1 and 2. For purposes hereinafter described, the second disc 2 is provided with a circumferentially extending series of spaced apertures 11, in communication with each of which apertures there is provided a laterally extending discharge spout 12, having its free end deflected angularly outwardly with respect to said wheel, the inner bottom surface of each spout preferably forming a continuation of the upper surface of the adjacent forward compartment wall 8. Each of said apertures in addition to being positioned adjacent to the rear surface of the forward wall of one of said compartments, is also adjacent to the outer or peripheral edge of said disc 2.

Supported above said rotatable element or wheel is a rectangular hopper 14, which terminates downwardly in a vertically restricted opening 15, from which a deflector 16 is directed as desired toward the compartments in said element, so as to discharge material from said hopper thereinto, as said compartments are successively presented beneath said hopper adjacent to the uppermost portion of their circular path of movement. A fairly continuous flow of metallic particles and a relatively large quantity of water are simultaneously discharged into said hopper in a turbulent manner, the metallic particles being carried thereto by suitable conveyor belts 17, leading from a magnetic separator or other source, and passing over pulleys 18, which are rotatably supported by extensions 19 of the framework hereinbefore referred to, or otherwise if desired.

A second hopper 20 is positioned below said rotatable element or wheel and is preferably rectangular when viewed from above. This hopper is composed of substantially V-shaped side walls 21, connected at their forward and rear edge portions by downwardly converging walls 22, the lowermost portions of which last-mentioned walls are spaced apart to provide a discharge opening 23, beneath which a deflector 24 directs material falling into said hopper towards the central portion of another conveyor belt 25, which takes material falling thereupon to any desired locality such for instance as cars, trucks, storage bins, or otherwise as may be desired.

One of the vertical sides 21 of said lower hopper is cut away at 26 to permit the free passage of the spouts 12 above it, while the opposite vertical side may be likewise cut away or may assume its full vertical extent up to a point adjacent to the shaft 3 if preferred (as indicated in Fig. 4). Supported in any suitable manner by the framework 5 is a trough 27, into which the spouts 12 discharge the excess or free water from within the several wheel compartments successively. An upwardly extending guard 28 may be provided, if desired, to prevent water from said spouts overshooting the relatively narrow transverse limits of said trough 27, said guide being supported in any suitable manner as by the framework 5 upon one side of the rotatable element or wheel, and comprising a screen, imperforate member, or other suitable device.

In the operation of this improved de-watering machine, the finely ground iron or other metallic particles are received, together with a relatively large proportion of water in the hopper 14, whence the turbulent mass flows downwardly into the wheel compartments, as they successively pass their receiving position beneath said hopper's discharge outlet 15. As said wheel continues to steadily rotate, the relatively heavy particles of metal rapidly settle to the bottom 29 of a compartment, leaving the relatively lighter-weight water and any impurities suspended therein superimposed as an upper layer, as shown at 30 in Fig. 3. As the wheel continues to rotate in the direction of the arrow, the water readily flows from said compartment by way of the adjacent aperture 11 and spout 12, the level of the water gradually decreasing, while the metallic particles, having fairly solidly compacted in the bottom of the compartment, remain substantially in their original position even after all of the excess or free water has flowed from said compartment, and until said compartment is in a substantially inverted position, when the metal in most cases will drop by gravity into a lower hopper 20, whence it is discharged through the aperture 23 upon the conveyor belt 25, as hereinbefore referred to.

At times and under certain conditions the deposit of metal in the several compartments will be inclined to stick to the walls thereof, especially when it has been found desirable to extract an additional amount of water from the particles. Both the extraction of additional water, and subsequent dislodgement of the particles from the wheel compartments, may be accomplished by a jarring or jolting of the wheel at periodic intervals. For this purpose a suitable mechanism comprising the periodic elevation of either one or both ends of the shaft 3 may be effected, as by means of a cam 31, and then suddenly dropping said shaft. For purposes of illustration, reference is made to Figs. 7 and 8, wherein one end of the shaft 3 is journalled in a bearing 32, so as to oscillate upon an axis 33 spaced beneath and at right angles to the axis of said shaft. The opposite end of said shaft is journalled in a bearing 34, which is preferably mounted upon an oscillatory lever 35, one end of which is pivotally mounted at 36, while the opposite end 37 is in contact with the cam 31, and the intermediate portion of said lever, while in its lowermost position, rests upon a suitable support 38, against which said lever abuts and is abruptly stopped, as it falls upon being released by one of the angular shoulders 39 of said cam.

A modified form of mechanism for effecting such jolting or jarring of said wheel is to periodically elevate the free end portion 37 of said shaft-supporting lever 35 by means of an electromagnet 40, energized by an electric current from any suitable source 41, under control of a switch lever 42, rotatable in synchronism with if not actually carried by said shaft 3, and at its outer free end contacting in sequence circumferentially spaced contact elements 43, which are electrically connected to said magnet and to said source of current by an appropriate system of wiring.

Having thus described my invention, what I claim and desire to protect by Letters Patent of the United States is:

1. A liquid separating machine comprising a receptacle, means mounting said receptacle for rotation, said receptacle having spaced side walls, spaced generally radial walls bridging said side walls and a wall bridging all of said walls located between the periphery and axis of rotation of the side walls to form a compartment, one of said side walls having a discharge opening adjacent to the forward generally radial wall of said compartment, the rotation of the receptacle enabling disposal of said last-mentioned wall in and out of liquid draining relation to said opening, and said forward generally radial wall in the direction of rotation having its outer end edge oblique with respect to the plane of rotation of the receptacle to facilitate said draining.

2. A liquid separating machine comprising rotatable shaft means, a pair of spaced disks mounted thereon, partition members bridging the space between said disks to form compartments, each partition member having a generally radially disposed wall provided with an angular portion directed obliquely with respect to the plane of rotation of the compartments, and a wall extending from each said generally radial wall to the adjacent generally radial wall between the periphery and axis of rotation of the machine forming the bottom of a compartment, and one of said side walls having drain openings adjacent the outer ends of the generally radially disposed walls through which liquid is directed by said angular portions.

3. A liquid separating machine comprising rotatable shaft means, a pair of spaced disks mounted thereon, one of said disks having drain openings, partition members bridging the space between said disks to form compartments, each partition member having a generally radially disposed wall provided with an outer free edge portion adjacent an associated drain opening, directed obliquely with respect to the plane of rotation of the compartments toward the latter drain opening to facilitate drainage through said openings, and a wall extending from each of said generally radial walls to the adjacent generally radial wall between the periphery and axis of rotation of the machine forming the bottom of a compartment.

4. A liquid separating machine comprising a receptacle, means mounting said receptacle for rotation, said receptacle having spaced side walls, spaced generally radial walls bridging said side walls and a wall bridging all of said walls located between the periphery and axis of rotation of the side walls to form a compartment, the third-mentioned walls being approximately at an angle obtuse with respect to one adjacent generally radial wall and approximately at right-angles to the other generally radial wall, one of said side walls having a discharge opening adjacent the outer end of one of the radially disposed walls, the latter generally radial wall being foremost in the direction of rotation and having its outer end edge oblique with respect to the plane of rotation of the receptacle to facilitate drainage of liquid toward said opening.

MANFRED T. HOSTER.

REFERENCES CITED

The following references are of record in the file of this patent:

UNITED STATES PATENTS

| Number | Name | Date |
| --- | --- | --- |
| 871,366 | Schwarz | Nov. 19, 1907 |
| 633,040 | Reed | Sept. 12, 1899 |
| 1,231,409 | Moore | June 26, 1917 |
| 486,715 | Imlay | Nov. 22, 1892 |
| 826,824 | Apostoloff | July 24, 1906 |
| 203,104 | Bennett | Apr. 30, 1878 |
| 975,331 | Davidson | Nov. 8, 1910 |
| 1,350,154 | Hamilton | Aug. 17, 1920 |
| 2,322,415 | Buckbee | June 22, 1943 |
| 2,070,201 | Geary | Feb. 9, 1937 |
| 2,061,841 | Lang | Nov. 24, 1936 |
| 2,131,690 | Marshall | Sept. 27, 1938 |
| 2,136,400 | Steindorf | Nov. 15, 1938 |